United States Patent [19]

Blair et al.

[11] 3,960,221

[45] June 1, 1976

[54] TILLAGE TOOL TRANSPORT ARRANGEMENT

[76] Inventors: Calvin B. Blair, P.O. Box 76; John W. Blair, P.O. Box 47, both of Barnard, Kans. 67418

[22] Filed: Sept. 18, 1974

[21] Appl. No.: 506,957

[52] U.S. Cl. .............................. 172/311; 172/456; 280/411 A
[51] Int. Cl.² .......................................... A01B 73/00
[58] Field of Search ........... 172/311, 452, 456, 458, 172/459, 476, 482, 491, 776; 280/34 R, 34 A, 411 R, 411 A, 412, 413; 16/147; 292/201, 240

[56] References Cited
UNITED STATES PATENTS

| | | | |
|---|---|---|---|
| 2,966,219 | 12/1960 | French | 172/311 X |
| 3,003,789 | 10/1961 | Calkins | 280/411 A |
| 3,481,408 | 12/1969 | Twidale | 172/311 |
| 3,539,016 | 11/1970 | Bauer et al. | 172/311 |
| 3,542,138 | 11/1970 | Fackler et al. | 172/776 |
| 3,810,660 | 5/1974 | Peterson | 280/411 A |
| 3,811,516 | 5/1974 | Thompson et al. | 172/311 |

*Primary Examiner*—Richard J. Apley
*Assistant Examiner*—Richard T. Stouffer
*Attorney, Agent, or Firm*—Fishburn, Gold & Litman

[57] ABSTRACT

An earth tillage apparatus has a hydraulically liftable, foldable carriage with sections which extend laterally from a tongue to a wide field working position and are foldable to a narrow transport or storage position. Rigid structural arms are hingedly mounted on the tongue and have free ends extending laterally a substantial distance therefrom. In a preferred embodiment, cables respectively have one end secured to the tongue and the other end secured to the wings and extend through a pulley mounted on each of the arm free ends for the purpose of positioning the point of pull a substantial distance laterally of the tongue thereby reducing the tendency for inwardly buckling the carriage. The arms are locked in their laterally extending position when the wings are in the wide field position and are selectively released to hingedly move to a second or transport position when the wings are folded. The arms and cables are arranged relative to the tongue and carriage to maintain cable tension and prevent dragging thereof.

6 Claims, 5 Drawing Figures

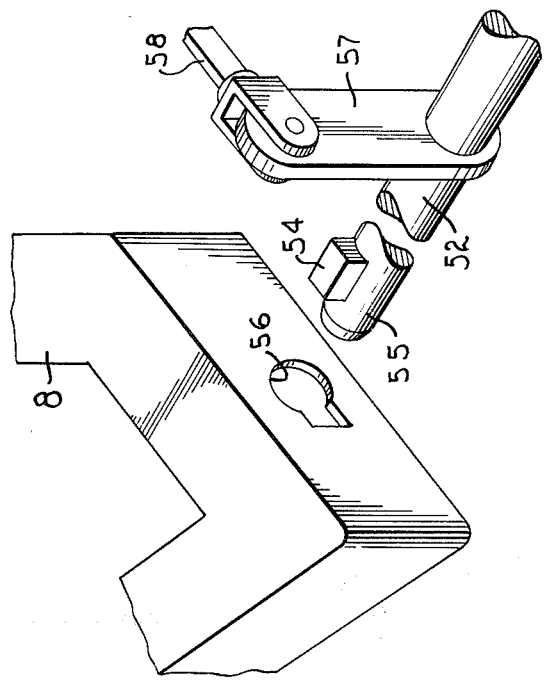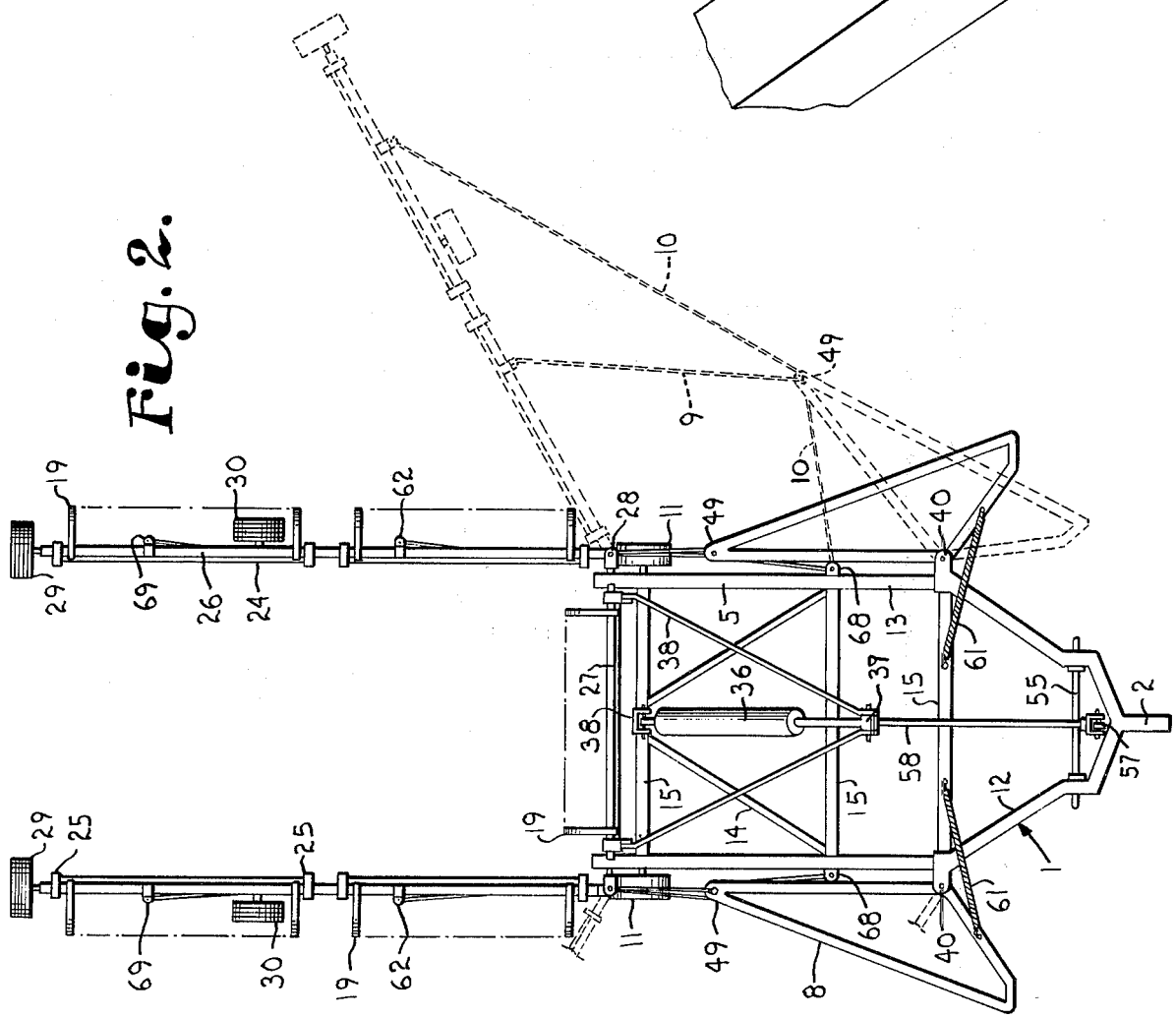

TILLAGE TOOL TRANSPORT ARRANGEMENT

The present invention relates to a farm implement which is drawn behind a tractor or the like for said preparation. In the past few years large, foldable wing farm equipment has become popular because it enables the farmer to cultivate greater areas in less time, for example, see Fischer U.S. Pat. No. 3,654,999 issued Apr. 11, 1972. Attempts are now made to produce such winged tillage devices adapted to work up to a 90 foot strip of ground in each pass. Such large equipment must be designed to withstand large forces which complicate construction and operation. One of the problems involves the propensity of high angle draw cables to produce great inward forces which tend to buckle the wings toward the central tongue. In this invention, the draw cables are supported or secured at points located a substantial distance laterally of the central tongue to reduce the inward buckling forces, and such placement is accomplished without serious cable handling difficulties during wing folding.

The principal objects of the present invention are: to provide improved winged tillage apparatus for working wide strips of soil; to provide such tillage apparatus which utilizes draw cables, but with minimum tendency for inward buckling of wings; to provide such a tillage apparatus which is operable by the driver without his having to dismount from the tractor; to provide such tillage apparatus which has rigid, laterally extending arm members pivotally mounted on the tongue to conveniently place the point of cable pull to positions spaced laterally of the tongue; to provide such tillage apparatus arranged to prevent excessive slackening of the cables when the wing sections are moving into or out of transport position; to provide such tillage apparatus with coordinated lock means which releasably retain the arm members in laterally extending position in conjunction with tool carrier lifting and dropping operations; and to provide such tillage apparatus which is economical to manufacture and well adapted for its intended use.

Other objects and advantages of this invention will become apparent from the following description taken in connection with the accompanying drawings, wherein are set forth by way of illustration and example certain embodiments of this invention.

FIG. 2 is a plan view of the tillage tool shown in a transport position with the wing frame sections folded rearwardly.

FIG. 4 is a fragmentary perspective view, on a larger scale, showing the arm member locking arrangement.

Figure 1:
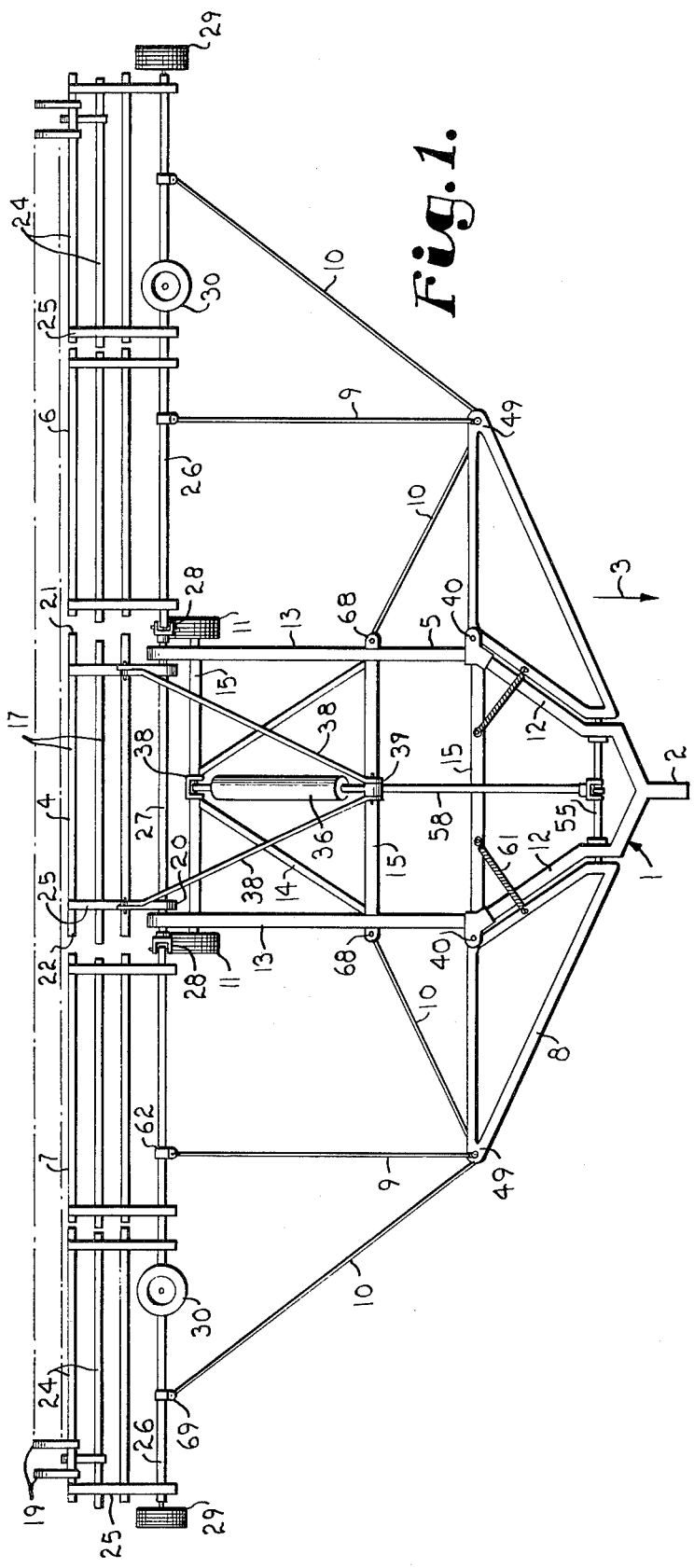
FIG. 1 is a plan view of a tillage tool embodying this invention shown in field working position.
Figure 3:
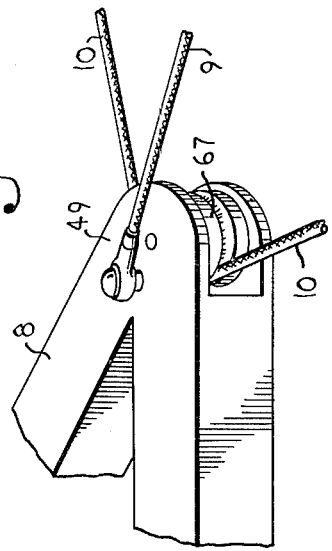
FIG. 3 is a fragmentary perspective view, on a larger scale, showing the cable supporting ends of the arm members.
Figure 5:
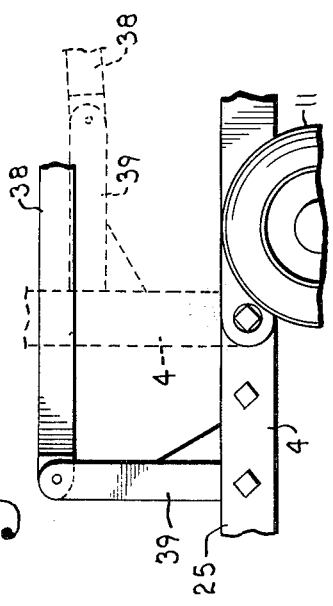
FIG. 5 is a fragmentary side elevation showing a frame lifting lever.

Referring more in detail to the drawings:

The reference numeral 1 designates generally a tillage tool transport apparatus adapted for ground conditioning and for trailing behind a farm tractor (not shown) secured to a hitch member 2 for movement in a forward direction 3. The tillage tool 1 includes a center drawbar frame section 4 mounted on a tongue 5. Wing frame sections 6 and 7 are hingedly mounted on opposite lateral ends of the center frame section 4. The frame sections 6 and 7, in the field working position illustrated in FIG. 1, extend laterally from the tongue 5 a substantial distance. Rigid arm members 8 are suitably mounted on opposite sides of the tongue 5 and extend laterally therefrom a substantial distance with cables or the like 9 and 10 extending between and cooperating with respective wing sections 6 and 7 to position the point of pull laterally from the tongue 5.

In the structure shown, the tongue 5 is movably supported with wheels 11 suitably mounted thereon adjacent opposite sides of the rear end thereof. The tongue, in this example, is a modified A-shape having forward frame members 12 diverging rearwardly from the hitch 2 generally parallel side frame members 13 extending rearwardly therefrom. Brace members 14 and 15 are secured to and extend between the various frame members to provide a rigid structure.

The center drawbar frame section 4 can be of any suitable type and has a plurality of elongated, transversely extending, rectangular cross-section bars 17 positioned in parallel rows for receiving suitable ground positioned in parallel rows for receiving suitable ground working tools 19. The center frame section 4 is hingedly mounted at 20 on the tongue 5 whereby it is movable between a rearwardly extending, horizontal field working position, as shown in FIG. 1, and a vertical transport position as shown in FIG. 2. The wing sections 6 and 7 are each hingedly mounted on said center frame section 4 by structure described below and extend laterally from opposite ends 21 and 22 thereof. The wing sections 6 and 7 have elongated bars 24 in spaced apart and parallel relation in the manner of the center section 4. The sections 4, 6 and 7 include structural beams 25 extending longitudinally to the direction of travel and tying the sections into respective rigid configurations.

An elongated, transverse lift axle 26 extends through the forward ends of each of the beams 25 and is rotationally fixed thereto. A center section 27 of the lift axle 26 is hinged to outer portions of the axle 26 by means of flexible joints 28 which permit free pivotal movement in only one direction, i.e., about a vertical axis when the joints are rotated to the position shown in FIG. 2.

Wheels 29 are mounted on the free ends of the wing sections 6 and 7 whereby they are movably supported in spaced relation to the ground when in a field working position. A set of wheels 30 are mounted on the outer portions of the axle 26 and rotating about an axis normal to the wheels 29. The wheels 30 are adapted to movably support the wing sections 6 and 7 in the transport position shown in FIG. 2.

Power lift means in the form of an hydraulic ram 36 is utilized for selectively moving the sections 4, 6 and 7 from the horizontal ground working position to the generally vertically disposed position as shown in FIG. 2. In the illustrated structure, the ram 36 is attached at one end by a pivot mount 38 to a rear tongue brace 15. The other end of the ram 36 is pivotally engaged with the ends 37 of draw bars 38 which are, in turn, connected to lever arms 39 projecting from the center section 4. The ends 37 are stabilized by pivotal connection to a lever arm which rotates about the adjacent brace 15. In the structure shown, extension of the ram 36 effects forward movement of the arms 39, thereby effecting pivoting of the center frame section 4 about the hinges 20 from the field working position to the generally vertical position. Retraction of the ram 36 effects movement in the opposite direction. By virtue of the axle 26, the wings 6 and 7 pivot with the center frame section 4.

The arms 8, in this example, are hingedly mounted at 40 to the tongue 5 for movement in a horizontal plane. The arms 8 are shown here as being generally triangularly shaped and hinged whereby the free ends 49 may move rearwardly from a laterally extended position as illustrated in FIG. 1 to a position as illustrated in FIG. 2, where the free ends 49 lie adjacent the frame members 13. It is to be noted that the arms 8, in the alternative, can be hinged on the forward most corner near the hitch 2 and would then pivot over the tongue 5 when the free ends 49 are moved rearwardly.

Lock means 52 are provided for cooperative interengagement with receiving portions of the arms 8 releasably retaining the arms in field operational position. The lock means can be of any suitable type, but as shown, includes a bolt 54 fixed to a shaft 55 which in turn is rotatably, transversely mounted on the tongue 5 near the hitch 2. The bolt 54, when aligned, is receivable into a key hole 56 in one side of the arm 8, FIG. 4. The shaft 55 has secured thereto a lever arm 57 which is pivotally engaged with a rod 58 also engaged with the ram end at 37. The actuation of the ram 36 to drop the sections 4, 6 and 7 to field working position also rotates the shaft 55 to lock the bolt 54 within the arm 8, thereby retaining the free ends 49 in the laterally extending position shown in FIG. 1. A tension spring 61 is connected between the tongue 5 and each arm 8 to resiliently urge the arms toward operational position.

The cables 9 and 10 in the illustrated structure, may take other forms, such as chains, it being understood that any suitable flexible member may be used. The cable 9, in the arrangement shown, is anchored at one end to the arm free end 49 and at the other end to a suitable retainer 62 mounted on the axle 26 in a position whereby the cable 9 is generally parallel to the tongue frame member 13. A pulley 67 is mounted on each of the arms 8 in the free ends 49 and engages the cable 10 which has its ends secured respectively to an anchor point 68 on the tongue 5 and a retainer 69 mounted on the axle 26 substantially outwardly of the retainer 62. The geometric locations of the anchor points of the cables 9 and 10 are such that geometrically the cables will remain relatively taut regardless whether the frame sections 6 and 7 are in the field working position (FIG. 1) or the transport position (FIG. 2) as noted further below.

When it is desired to transport the tillage tool 1 from one work area to another, the ram 36 is extended, lifting the wing sections 6 and 7 and the center frame section 4 to their vertical position thereby moving the wheels 30 into, and the wheels 29 out of, engagement with the ground. Near the end of the ram stroke, the bolt 54 is rotated into alignment with the slot of the key hole 56 and the arms 8 are released from locked position against rotation out of the field working position of FIG. 1. Forward movement of the apparatus 1, with the frame sections in their vertical position, and the wheels 30 in engagement with the ground urges the wing frame sections 6 and 7 to their trailing or transport position, as shown in FIG. 2. During folding of the wing frame sections 6 and 7 to trailing position, the arms 8 hingedly move about pivot point 40 with the free ends 49 pivoting rearwardly. The cables 10 are maintained under tension, due to the springs 61 and geometry of the anchoring points in association with the lever arms involved, and runs through the arm ends 49 in contact with the pulleys 67. The cable 9 also remains under tension in the manner of a collapsing parallelogram. Thus, the cables 9 and 10 do not drag or bind during the folding operation, permitting easy and complete control from a remote position on the tractor (not shown).

When it is desired to return the tillage tool 1 to its field working position, rearward movement urges the wing sections 6 and 7 to the laterally extending position whereupon the bolt 54 enters the slot of the key hole 56. Retraction of the ram 36 then lowers the sections to a horizontal, working attitude and simultaneously rotates the lock shaft 55, securing the arms 8 for resisting the working tension of the cables 9 and 10.

It is to be understood that various modifications and refinements may utilize the novel features described above without departing from this invention. For example, additional cables may be used in the manner of cables 10, but at different angles for supporting added wing sections, the arms 8 may, additionally, pivot upwardly and inwardly after being placed in the transport position to further reduce the transport width of the apparatus, and, as noted above, a different pivot point may be selected for the arms 8 so they initially pivot inwardly and horizontally over the tongue 5.

It is to be further understood that while certain forms of this invention have been illustrated and described, it is not to be limited thereto except to the extent that such limitations are found in the appended claims.

What is claimed and desired to secure by Letters Patent is:

1. An agricultural ground conditioning implement adapted to be pulled behind a tractor or the like, said implement comprising:
   a. a draw tongue;
   b. a center frame member hingedly mounted rearwardly on said tongue and pivotable on an axis extending transversely of said tongue from a horizontal to a vertical position;
   c. a wing frame member hingedly mounted on each end of said center frame member, said wing frame members being movable with said center frame member between a horizontal and a vertical position, said wing frame members also being pivotable to a position trailing said center frame member;
   d. means operably connected to said frame members for selectively moving same between said horizontal and vertical positions;
   e. arm members pivotally mounted on said tongue forwardly of said center frame member and normally extending laterally from opposite sides thereof a substantial distance; means for selectively locking said arms in said laterally extending condition, means provided between said frame member moving means and said locking means whereby said locking means is actuated when said frame members are moved into said horizontal position; and
   f. tensile members extending between and cooperating with said arm members and wing frame members and selectively supporting said wing frame members against rearward movement during operation of said implement.

2. An agricultural ground conditioning implement adapted to be pulled behind a tractor or the like, said implement comprising:
   a. a draw tongue;

b. a center frame member hingedly mounted rearwardly on said tongue and pivotable on an axis extending transversely of said tongue from a horizontal to a vertical position;

c. a wing frame member hingedly mounted on each end of said center frame member, said wing frame members being movable with said center frame member between a horizontal and a vertical position, said wing frame members also being pivotable to a position trailing said center frame member;

d. means operably connected to said frame members for selectively moving same between said horizontal and vertical positions;

e. arm members pivotally mounted on said tongue forwardly of said center frame member and normally extending laterally from opposite sides thereof a substantial distance; means for selectively locking said arms in said laterally extending condition, said frame member moving means including a hydraulic ram mounted on said tongue and operably connected to said locking means for simultaneous operation of said locking means with the movement of said frame members, and f. tensile members extending between and cooperating with said arm members and wing frame members and selectively supporting said wing frame members against rearward movement during operation of said implement.

3. In an agricultural tillage implement having a drawn tongue and a foldable wing frame member, said implement being movable in a substantially horizontal plane, said wing frame member being operably connected to said tongue and normally projecting laterally therefrom, and a cable for resisting the rearward deflection of said wing frame member, the improvement comprising:

a. an arm normally projecting laterally of said tongue in front of said wing frame member, mounting means movably mounting said arm on said tongue for unfolding of said arm away from said tongue when said arm is moved forwardly in said substantially horizontal plane and folding thereof toward said tongue when said arm is moved rearwardly in said substantially horizontal plane, said mounting means movably mounting said arm for unfolding and folding thereof with the unfolding and folding of said wing frame member respectively; and b. said cable extending between and cooperating with said arm and said wing frame member, said cable being supported by a portion of said arm which is outwardly projecting when said wing frame member is in said laterally projecting position to provide selective support for said wing frame member.

4. The agricultural tillage implement set forth in claim 3 including:

a. means cooperating with said tongue and said arm and urging said arm toward an unfolded position, thereby tending to maintain tension on said cable.

5. The agricultural tillage implement set forth in claim 3 wherein:

a. said portion of said arm providing support for said cable includes a pulley engaging said cable, and b. said cable is anchored to said tongue.

6. The agricultural tillage implement set forth in claim 3 including:

a. means cooperating between said tongue and said arm and operable to selectively lock said arm in said laterally projecting position.

* * * * *